United States Patent
Chan et al.

(10) Patent No.: US 7,752,269 B2
(45) Date of Patent: Jul. 6, 2010

(54) ADHOC SECURE DOCUMENT EXCHANGE

(75) Inventors: Kevin Chan, Ryde (AU); Muneyb Minhazuddin, Quakers Hill (AU); Alexander Martin Scholte, Chatswood (AU); James D. Schreuder, Summer Hill (AU)

(73) Assignee: Avaya Inc., Basking Ridge, NJ (US)

( * ) Notice: Subject to any disclaimer, the term of this patent is extended or adjusted under 35 U.S.C. 154(b) by 1064 days.

(21) Appl. No.: 10/760,681

(22) Filed: Jan. 19, 2004

(65) Prior Publication Data

US 2005/0182821 A1    Aug. 18, 2005

(51) Int. Cl.
G06F 15/16 (2006.01)
(52) U.S. Cl. .................... 709/206; 713/183
(58) Field of Classification Search .......... 709/206; 713/183
See application file for complete search history.

(56) References Cited

U.S. PATENT DOCUMENTS

| | | | |
|---|---|---|---|
| 5,017,917 A | 5/1991 | Fisher et al. | |
| 5,790,789 A | 8/1998 | Suarez | |
| 6,175,831 B1 | 1/2001 | Weinreich et al. | |
| 7,184,538 B1 | 2/2007 | Doskow et al. | |
| 7,340,769 B2 | 3/2008 | Baugher | |
| 7,363,490 B2 | 4/2008 | Paulsen et al. | |
| 7,421,472 B1 | 9/2008 | Ross, Jr. | |
| 2002/0016818 A1* | 2/2002 | Kirani et al. ............... 709/217 |
| 2002/0042884 A1* | 4/2002 | Wu et al. .................. 713/201 |
| 2002/0161589 A1 | 10/2002 | Strandberg | |
| 2002/0174010 A1* | 11/2002 | Rice, III ................... 705/14 |
| 2003/0237005 A1* | 12/2003 | Bar-Or et al. .............. 713/201 |
| 2004/0024826 A1* | 2/2004 | Halahmi et al. ............ 709/206 |
| 2004/0093428 A1 | 5/2004 | Arnold et al. | |
| 2004/0117456 A1* | 6/2004 | Brooks ..................... 709/217 |
| 2006/0031328 A1 | 2/2006 | Malik | |
| 2006/0048210 A1 | 3/2006 | Hildre et al. | |
| 2006/0053280 A1 | 3/2006 | Kittle et al. | |
| 2006/0224750 A1 | 10/2006 | Davies et al. | |

OTHER PUBLICATIONS

Cooke, "An Expert on a disc: Automating Data Classification Work Using Expert Systems", W.J. Cooke & Associates, 1994, pp. 1-7, available at http://www.uncle.com/es4dsc.html, printed May 3, 2004.
U.S. Appl. No. 10/944,096.
U.S. Appl. No. 12/242,905.
SpamBayes: Bayesian anti-spam classifier written in Python, pp. 1-5, available at http://spambayes.sourceforge.net/ printed May 3, 2004.

* cited by examiner

*Primary Examiner*—Jungwon Chang
(74) *Attorney, Agent, or Firm*—Sheridan Ross P.C.

(57) ABSTRACT

Embodiments of the present invention are directed to a system capable of enforcing document security and delivery policies. In particular, the present invention allows for the detection and removal of files attached to electronic messages. When an attached file is removed from an electronic message, the file may be placed in secure storage. A link to the stored file is inserted in the electronic communication prior to delivery of the message to the addressee of the communication. In order to access the stored file, the recipient of the message is required to select the provided link, which establishes a secure communication channel between the secure storage device and the receiving client computer. Optionally, the recipient may also be required to provide a password and/or digital certificate in order to access the stored file.

22 Claims, 4 Drawing Sheets

ADHOC SECURE DOCUMENT EXCHANGE

FIELD OF THE INVENTION

Embodiments of the present invention are directed to the exchange of documents. In particular, embodiments of the present invention provide for the convenient and secure exchange of documents over communication networks.

BACKGROUND OF THE INVENTION

Communication networks are increasingly relied on by individuals and businesses to exchange information. For example, email provides a convenient and inexpensive means for exchanging information. In addition to allowing for the exchange of textual messages, email allows users to attach computerized files for transmission to the recipient. However, email that is sent across the Internet is relatively easy for even a casual hacker to intercept and read, unless its contents are encrypted. Therefore, the exchange of sensitive documents over unprotected networks such as the Internet can result in the inadvertent disclosure of sensitive information.

In order to ensure the security of information delivered over the Internet, various encryption methods have been developed. For example, pretty good privacy (PGP) applies asymmetric encryption to prevent unauthorized access to information. PGP encryption methods require that the parties to an exchange of information first exchange their asymmetric public keys. In addition, the parties must install the same encryption software. Accordingly, the use of PGP mail requires prior arrangement of software licenses and the configuration of encryption keys at both ends of the email communication.

Other methods for providing secure access to documents over the public Internet also require the use of specialized software installed at both ends of a communication channel, and coordinated configuration. Accordingly, such methods cannot be used on an adhoc basis.

SUMMARY OF THE INVENTION

According to embodiments of the present invention, an electronic message is checked for attached files before being released for delivery across an unsecured network. If an attached file is detected, the file is stripped from the message, and stored in a secure location. In addition to stripping the attachment from the message, the message is modified to include a link to the stored file. The modified message is then delivered to the addressee.

In accordance with embodiments of the present invention, the addressee may access the stored file by selecting the link included in the electronic message. In particular, the link may allow the addressee to retrieve the stored file over a secure connection. In accordance with further embodiments of the present invention, the addressee may be required to provide authentication before the stored document is released. Such authentication may be in the form of a password or digital certificate.

Embodiments of the present invention may be implemented as instructions running on an email server associated with a network on which an originating client machine is located. In accordance with further embodiments, the email server may comprise or be associated with a secure document server, such as a hypertext transfer protocol-secure (HTTPS) server that includes or is associated with storage for files.

Additional aspects of the present invention will become more readily apparent from the filing description, particularly when taken together with the drawings.

DETAILED DESCRIPTION

Figure 1:
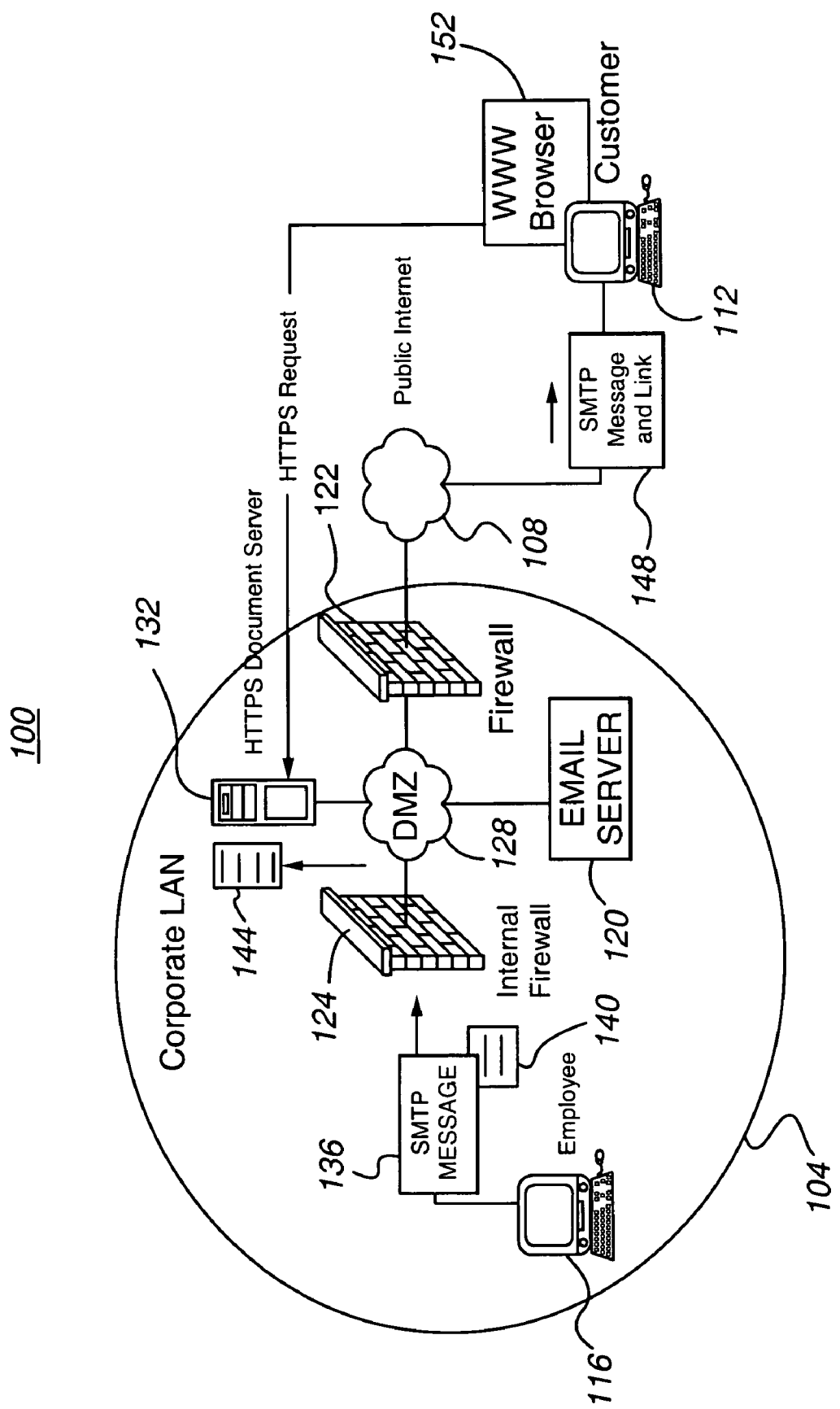
FIG. 1 is a schematic diagram depicting a communication system in accordance with an embodiment of the present invention.

With reference now to FIG. 1, a communication system 100 in accordance with an embodiment of the present invention is depicted. The communication system 100 generally includes a private or corporate local area network (LAN) 104 that is interconnected to an unsecure communication network 108, such as the public Internet. In addition, the communication system 100 includes receiving or addressee client computer 112 interconnected to the private LAN by the unsecure network 108.

The private network 104 generally includes an initiating or sending client computer 116 and an email server 120. The private network 104 may also include an external firewall 122. The external firewall 122 may, as can be appreciated by one of skill in the art, be implemented as part of an edge router connecting the private LAN 104 to a WAN such as the Internet, or as part of some other device, such as the email server 120. In addition, the private LAN 104 may comprise an internal firewall 124, for example where a corporate DMZ 128 (demilitarized zone) is formed between the trusted internal portion of the private LAN 104 (e.g., the portion of the private LAN 104 in which the initiating client computer 116 is located) and the public Internet 108. The internal firewall 124 may be implemented as part of a network router or some other device, such as the email server 120. In addition, the private LAN 104 may include a secure document server 132. As can be appreciated by one of skill in the art, in accordance with embodiments of the present invention, the email server 120 and the secure document server 132 may be integral to one another.

Figure 2:
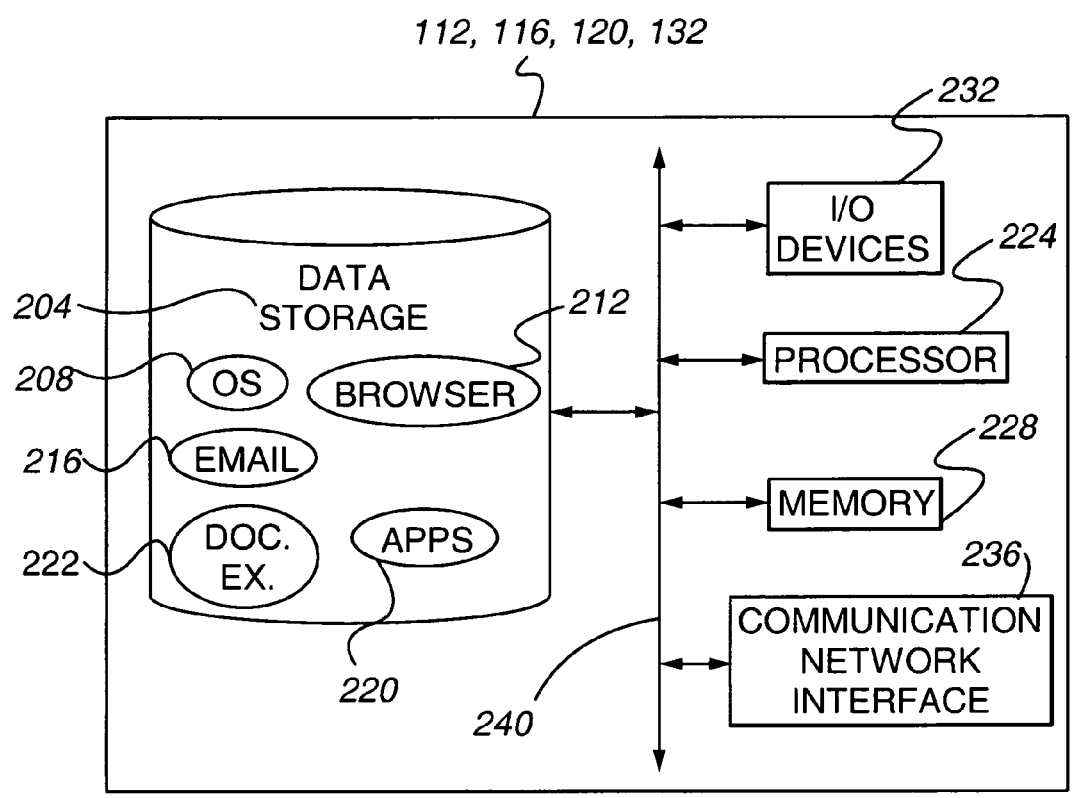
FIG. 2 is a block diagram depicting a client computer in accordance with an embodiment of the present invention.

With reference now to FIG. 2, an example of a client computer 112 or 116 is illustrated. In general, a client computer 112, 116 may include data storage 204 for storing programs and/or data. For example, the data storage 204 may store operating system 208, browser 212, and/or email applications 216. In addition, the data storage 204 may store any number of applications 220, such as word processing, spreadsheet, presentation or other applications. The data storage 204 may include magnetic storage devices, solid state storage devices, optical storage devices, logic circuits, or any combination of such devices. It should further be appreciated that the programs and data that may be maintained in the data storage 204 can comprise software, firmware or hardwired logic.

FIG. 2 is also illustrative of an email server 120 or a secure document server 132. In general, an email server 120 will maintain operating system software 208 in data storage 204. In addition, the applications maintained in the data storage 204 will typically differ from those maintained on other devices. For example, an email application 216 may, in the case of an email server 120, comprise an email administration program to provide the functionality of an email server. In addition, in accordance with embodiments of the present invention, the email server 120 will include a secure document exchange application 222 for performing operations associated with the present invention. With respect to a secure document server 132, the data storage 204 will be used to maintain files being held in secure storage. In addition, the secure document server 132 may run an application 220 for implementing the secure document storage functions performed by the secure document server 132. As can be appreciated by one of skill in the art, various combinations of programs and/or data may be maintained in the data storage 204, depending on the intended functionality of the associated device 112, 116, 120 or 132. Furthermore, it should be appreciated that a client computer 112 associated with the private LAN 104 may perform all or a portion of the secure document exchange functions. Accordingly, secure document exchange application software 222 may be maintained on data storage 204 associated with an initiating client computer 116. As can also be appreciated by one of skill in the art, programming and data operated on by various devices, including client computers 112, 116 and servers 120, 132 may be stored in other devices.

The client computer 112, 116 may additionally include a processor 224 capable of executing the program instructions. Memory 228 may be provided for use in connection with the running of software or firmware by the processor 224. The memory may comprise solid state memory, such as DRAM or SDRAM.

In addition, a client computer 112, 116 may include various input/output devices 232. For example, a video output or display may be provided for displaying messages and documents. In addition, input devices such as keyboards and pointing devices may be provided. A communication network interface 236 may be included to provide connectivity between the client computer 112, 116 and a communication network, such as a local area network 104 or wide area network 108 such as the Internet. An internal bus 240 may be provided to permit the exchange of instructions and data between the various components of the client computer 112, 116.

Figure 3A:
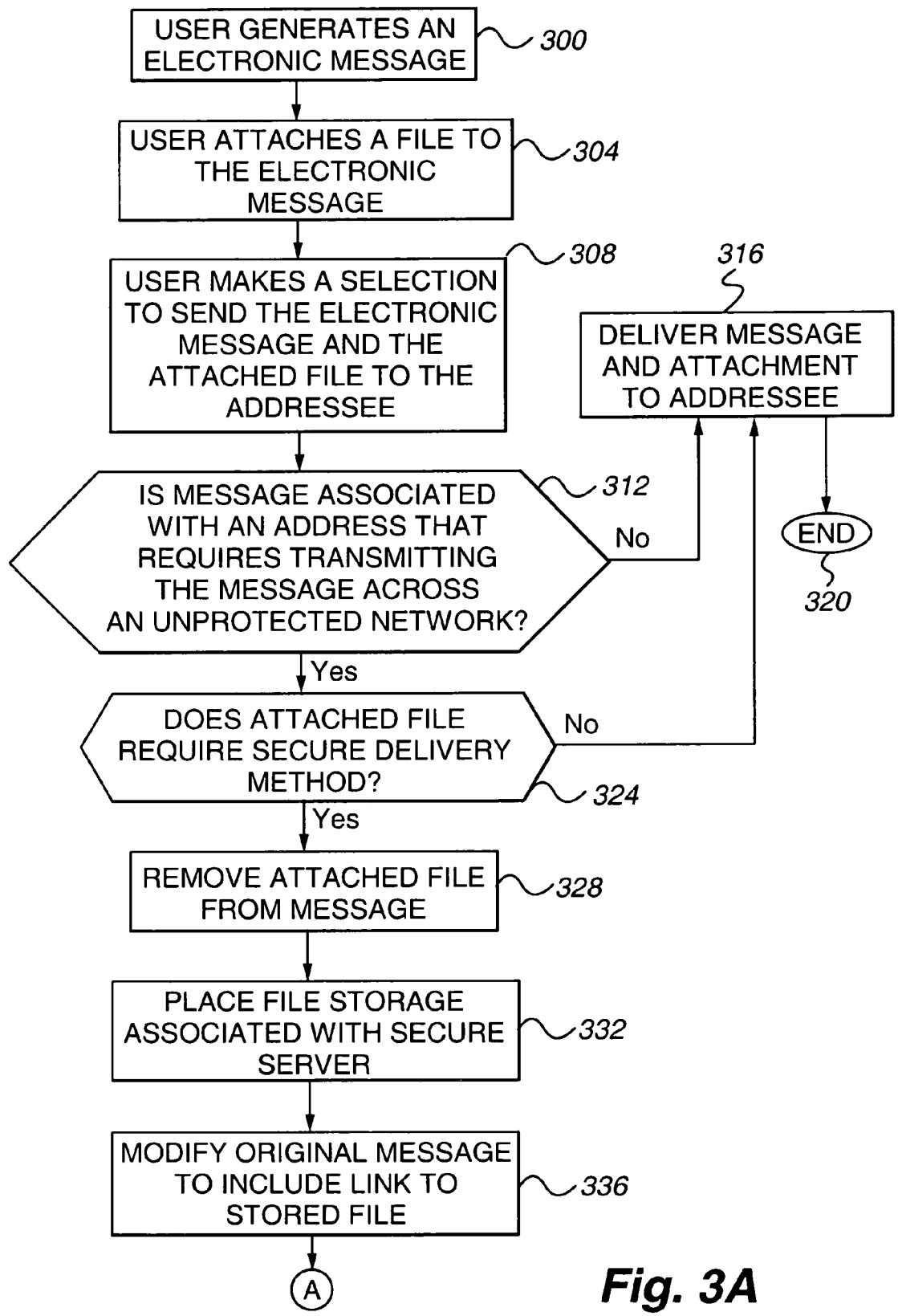
FIGS. 3A and 3B are flow charts illustrating the operation of a communication system in accordance with an embodiment of the present invention.
Figure 3B:
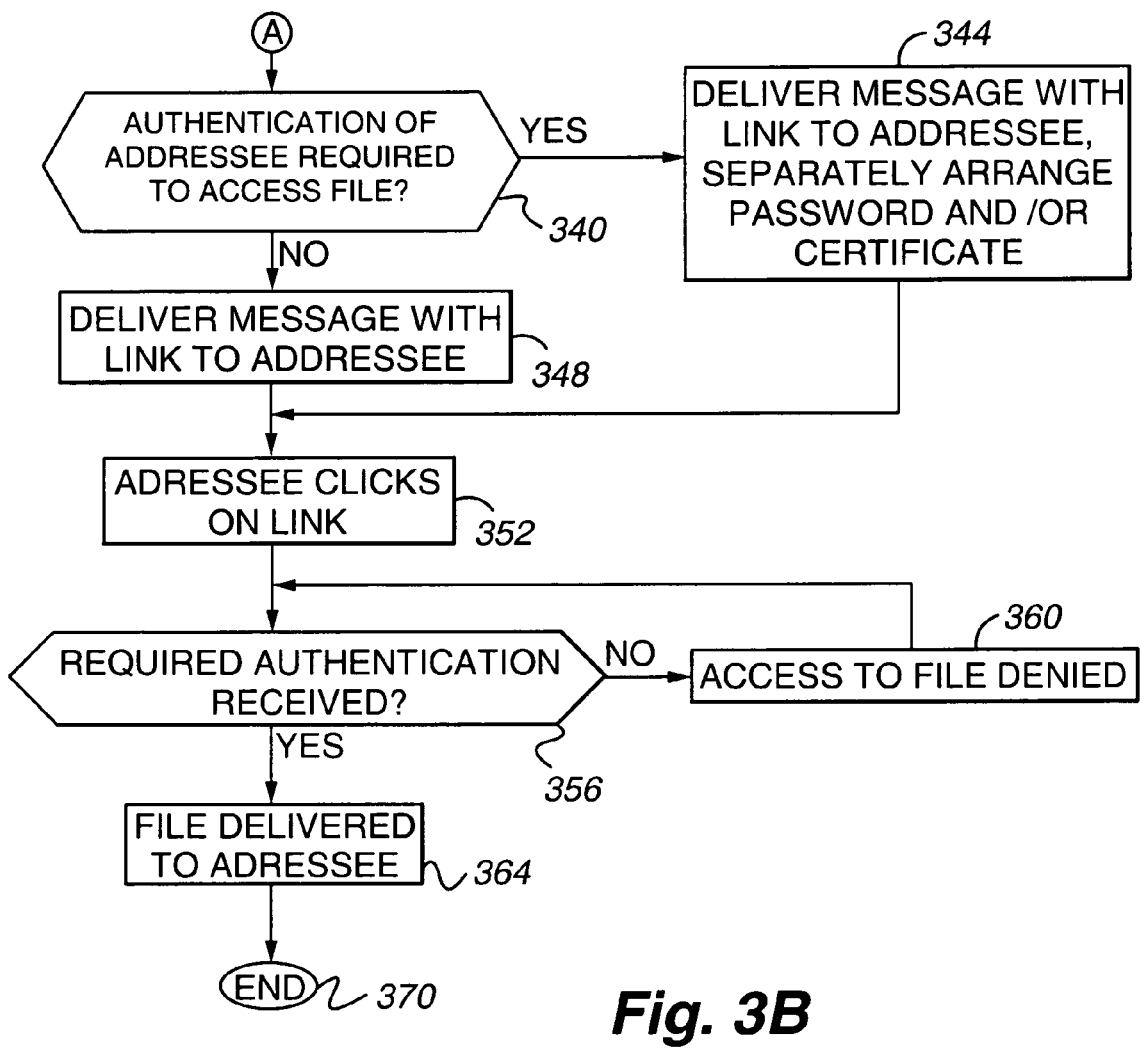

With reference now to FIGS. 3A and 3B, the operation of a system 100 in accordance with embodiments of the present invention is depicted. Initially, at step 300, a user of an initiating client computer 116 causes an electronic message to be generated. For example, the user may use an email application 216 running on the initiating client computer 116 to generate an email communication intended for delivery across a network 104 and/or 108 using the simple mail transfer protocol (SMTP). The user then attaches a file to the electronic message (step 304). In accordance with embodiments of the present invention, the file attached to the electronic message can be of any type. Examples of files that may be attached to any electronic message for delivery to an addressee include word processing files, spreadsheet files, slideshow presentations, or data files. At step 308, the user makes a selection to send the electronic message 136 and the attached file 140 (see FIG. 1) to the addressee. The sending of the electronic message 136 and the attached file 140 from the initiating client computer 116 is depicted in FIG. 1. A determination is then made as to whether the electronic message 136 is associated with an address that requires transmitting the message 136 across an unprotected network 108 (step 312). This determination may be made by or in connection with software running on the email server 120 included in the private LAN 104. Alternatively, the determination may be made as part of the operation of the external firewall 122.

If it is determined that the message 136 can be delivered over a protected network, the message 136 and the attached file 140 are delivered to the addressee (step 316) and the process ends (step 320). An example of a message 136 and attached file 140 that can be delivered over a secure network includes messages 136 addressed to other client computers within the same private LAN 104 as the originating client computer 116. Another example of a message 136 that can be delivered over a secure network includes messages that can be delivered over an established virtual local area network.

If it is determined that the message 136 requires transmission across an unprotected network 108, such as the public Internet, a determination is then made as to whether the attached file 140 requires secure delivery methods (step 324). If the attached file 140 does not require the use of a secure delivery method, the message and attachment may be delivered to the addressee (step 316). As can be appreciated by one of skill in the art, whether an attached file 140 requires a secure delivery method may be determined according to the policies of the entity operating the private LAN 104. As can further be appreciated by one of skill in the art, the particular security procedures that are to be applied in connection with a file 140 may also be determined by established policies. For example, an entity may establish different levels of security that can be applied to the attached files 140, depending on the assigned confidentiality level of a file, or depending on some other security determining criteria. As a further example, every attached file 140 may be required by policy to be delivered using a secure method.

If it is determined that the attached file 140 requires a secure delivery method; the attached file 140 is removed or stripped from the electronic message 136 (step 328). The removed file 140 is then placed in storage associated with a secure server 132 (shown as stored file 144 in FIG. 1) (step 332). At step 336, the electronic message 136 is modified to include a link to the stored file 144. The electronic message and link are depicted in FIG. 1 as SMTP message and link 148. In accordance with embodiments of the present invention, the included or inserted links comprises an HTTPS link. In accordance with other embodiments of the present invention, the link comprises any link that provides for a secure channel over which the stored file can be delivered to the addressee.

With reference now to FIG. 3B, at step 340, a determination is made as to whether authentication of the addressee is required in order to allow the addressee to access the stored file 144. If authentication is required, a password or certificate may be delivered to the addressee (step 344), in addition to the message and link 148. For example, a password may be delivered to the addressee by providing the addressee with a notification to contact the user associated with the originating client computer 116 by telephone or some other communication channel in order to receive the password. Alternatively, a pre-arranged password may be used. In accordance with another embodiment of the present invention, a password may be delivered to the addressee automatically, using a communication channel other than the public Internet 108, such as by electronically generating a message sent to the addressee by facsimile. In accordance with still other embodiments, the addressee may be required to obtain a digital certificate that must be presented to the secure server 132 before the stored file 144 is released to the addressee. Such digital certificate may be obtained by the addressee prior to or after delivery of the message and link 148 to the addressee. According to other embodiments, the email server 120 or external firewall 122 that stripped the attachment may retrieve or generate a password and deliver it to the addressee using a separate email (i.e., an email separate from message and link 148).

If separate authentication of the addressee is not required, the message and link 148 are delivered to the addresses (step 348).

After the addressee has been provided with the message and link 148, or after the addressee has been provided with the message and link 148 and the required password, the addressee may click on the link provided with the electronic message (step 352). As can be appreciated by one of skill in the art, by clicking on the provided link, the addressee or user associated with the receiving client computer 112 may activate a browser 152 associated with the receiving client computer 112. Furthermore, in accordance with embodiments of the present invention, the browser may support a secure transfer protocol, such as HTTPS. Accordingly, by clicking on the link, a request for the stored file 144 may be made by the receiving client computer 112 to the secure server 132.

At step 356, a determination is made as to whether any required authentication has been received. For example, the secure server 132 may determine whether a required password and/or certificate has been received in connection with the request for the stored file 144. If any required authentication has not been received, access to the stored file 144 is denied (step 360). The process may then idle at step 356 for as long as the request is pending, or until the required authentication has been received.

If required authentication has been received, or if no authentication is required, the stored file 144 is delivered to the addressee (step 364), and the process ends (step 370). As can be appreciated by one of skill in the art, the delivery of the stored file 144 to the receiving client computer 112 is performed over a secure channel. For instance, the stored file 144 may be delivered over an HTTPS communication channel established over the public Internet 108.

As can be appreciated from the description provided herein, the present invention allows for the enforcement of policies established to control the dissemination of information to addresses outside of a private LAN 104. As can further be appreciated, embodiments of the present invention allow for the automatic enforcement of such policies, by requiring that attachments to electronic messages be accessed over a secure communication channel. Furthermore, although access to a file must be made over a secure communication channel, the electronic message with which the electronic file is associated can be transmitted across an unsecure network, such as the public Internet. Upon receipt of the electronic message, the recipient can access the associated file by clicking on a provided link and, if required, providing a password and/or a digital certificate. Furthermore, the presentation of a password and/or digital certificate can be automated. From the description provided herein, it can be appreciated that embodiments of the present invention allow documents and other files to be exchanged over secure communication channels on an adhoc basis. That is, exchanges of information can be made using commonly available and installed email and browser application programs, and without requiring an exchange of encryption keys or other steps that require preconfiguration of both sender and recipient client computers.

In accordance with further embodiments of the present invention, it should be appreciated that the receiving or addressee computer 112 need not be connected to the public Internet 108 directly. For example, the receiving computer 112 may be part of a second local area network. In addition, it should be appreciated that a common password and/or digital certificate may be established for use in connection with transferring files between client computers located on a first local area network and client computers located on a second local area network. For instance, an enterprise having a number of local area networks interconnected to one another by an unsecured communication channel, such as a communication channel that comprises the public Internet, can establish authentication passwords or certificates for use by all or subsets of interconnected client computers. Similarly, a password and/or certificate may be established for use in connection with the transfer of files between a local area network associated with a first enterprise and a second local area network associated with a second enterprise that has a cooperative agreement with the first enterprise.

As can be appreciated by one of skill in the art, the implementation of security policies that establish different security levels for files, depending on the files' content, or type may be supported by embodiments of the present invention. For instance, files associated with different applications may be assigned different security levels and procedures. Alternatively or in addition, files may be assigned security levels depending on their content. The assigned security level for a file may be detected by the email server 120, and appropriate security procedures implemented. In accordance with embodiments of the present invention, an assigned security level may be associated with a file as a file property, as a header, footer, or other component of the file or a tag associated with the file. The assignment of security levels to files may be performed manually or automatically, for example by searching for key words. As can be appreciated, in a multi-tiered security system, certain files may not require secure delivery, in which case they are not stripped from the message, and therefore, are delivered conventionally, while other files requiring secure delivery are stripped from the original message, as described herein.

As can also be appreciated by those of skill in the art, the email server 120 or external firewall 122 that performs the functions of detecting and stripping files attached to email messages prior to delivery of the email message and the insertion of a link into the email message can be implemented in various ways. Furthermore, the email server 120 need not be implemented as a single device. For example, the functions of an email server 120 described herein may be shared or distributed across a number of server devices, and/or a number of email servers 120 may be included in a LAN 104. Similarly, a number of secure document servers 132 may be provided. In accordance with other embodiments of the present invention, the functions of detecting and stripping files attached to email messages may include other devices, such as the internal firewall 120, or the secure document server 132. Furthermore, embodiments of the present invention may implement various components, such as firewalls 120, 122 and servers 120, 132 in different or shared platforms or devices.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A non-transitory computational component storing instructions that are executed by a processor to perform a method, the method comprising:
   detecting by an email server an attachment to a first message comprising a first electronic message;
   removing said attachment from said first electronic message;
   associating a password with said attachment;
   storing said attachment in a secure storage device, wherein said password is required to access said stored attachment;
   inserting a link to said stored attachment in said first electronic message;
   delivering said first electronic message with said inserted link to a first delivery address;
   delivering said password to a second delivery address as part of a second message, wherein said first delivery address is different than said second delivery address;
   receiving by a user said first electronic message at said first delivery address;
   receiving by said user said second electronic message containing said password at said second delivery address;
   accessing by said user associated with said first and second delivery addresses said link to said stored attachment, wherein said accessing comprises a request by said user for said stored attachment;
   receiving by a secure server said request for said stored attachment;
   requesting said password from said user associated with said first and second delivery addresses; and
   in response to receiving said password from said user, delivering said attachment without alteration and in an original form to one of said first and second delivery addresses.

2. The method of claim 1, further comprising:
   delivering said attachment to said first delivery address.

3. The method of claim 2, wherein said attachment is delivered over a secure communication channel.

4. The method of claim 1, wherein said first electronic message is associated with said first delivery address, and wherein first said delivery address is outside of a domain from which said electronic message originates.

5. The method of claim 1, wherein said secure storage device comprises a hypertext transfer protocol secure server.

6. The method of claim 1, wherein said detecting comprises monitoring electronic message traffic at a firewall.

7. The method of claim 1, wherein said link to said stored attachment in said first electronic message comprises an HTTPS link.

8. The method of claim 1, wherein said computational component comprises a logic circuit.

9. The method of claim 1, wherein said computational component comprises a computer readable storage medium containing instructions for performing the method.

10. The method of claim 1, wherein said second delivery address is a facsimile number.

11. A method for enforcing security policies, comprising:
    generating a first electronic message;
    attaching a first file to said first electronic message;
    initiating delivery of said first electronic message and said first file;
    intercepting said first electronic message and said first file;
    removing said first file from said first electronic message;
    storing said first file;
    inserting a first link to said stored first file in said first electronic message;
    delivering said first electronic message and said first link to a first delivery address wherein a user is provided with the first electronic message at the first delivery address;
    generating a password notification message, wherein said password notification message includes a password or instructions for obtaining a password;
    delivering said password notification message to a second delivery address, wherein said first delivery address is different than said second delivery address, and wherein the user is provided with the password notification message at the second delivery address;
    receiving a request for said stored first file, wherein said receiving a request for said stored first file includes a user associated with said first delivery address clicking on said first link;
    requesting said password from said user requesting said first stored file; and
    in response to receiving said password, delivering said stored first file to said user, wherein said stored first file is delivered to said user in an original form.

12. The method of claim 11, wherein said second delivery address comprises a telephone number.

13. The method of claim 11, wherein said password notification message includes instructions for obtaining a password, wherein said instructions for obtaining a password require that the user contact a sender of the first electronic message to request said password.

14. A document delivery security system, comprising:
    a first client computer;
    a first communication network;
    at least a first server computer interconnected to said client computer by said first communication network;
    a communication interface between said first server computer and a second communication network;
    software running on said at least a first server computer operable to detect a first electronic message having an attached file and marked for delivery over said second communication network, and operable to remove said file from said first electronic message, wherein said first electronic message is provided to said communication interface for delivery to a first delivery address without said file and with a link to said file,
    wherein said software is further operable to cause a second electronic message to be provided to a second delivery address,
    wherein said second electronic message includes a first password,
    wherein said first delivery address is different than said second delivery address;
    wherein said first electronic message is delivered to said first delivery address, and
    wherein said second electronic message is delivered to said second delivery address;
    storage interconnected to said first server computer, wherein said file is stored in said storage, and wherein said first password is required to access said file,
    wherein said software running on said at least a first server computer is further operable to:
    respond to a request to access said file received in connection with a click on said link included in said first electronic message by requiring said first password, and in response to receiving said required first password is operable to provide said file to said communication interface for delivery to said first delivery address.

15. The system of claim 14, wherein said at least a first server comprises a firewall.

16. The system of claim 14, wherein said second communication network comprises the Internet.

17. The system of claim 14, wherein said first communication network comprises a private intranet.

18. The system of claim 14, wherein said second delivery address is a telephone number.

19. A communication system, comprising:
- means for receiving a first communication from a first communication network;
- means for detecting an attachment to said first communication;
- means for removing said detected attachment from said first communication;
- means for storing said removed attachment;
- means for inserting a link to said stored attachment in said first communication; and
- means for providing said first communication with said inserted link to a second communication network for delivery to a first delivery address and for providing a second communication containing a password necessary to access said stored attachment to said second communication network for delivery to a second delivery address, wherein said first delivery address and said second delivery address are different, wherein in response to a request to access said stored attachment entered by a recipient click on said inserted link, said recipient is required to provide said password, and wherein in response to receiving said password said stored attachment is delivered to said recipient without modification.

20. The system of claim 19, further comprising:
- means for generating said password required for access to said stored attachment.

21. The system of claim 19, further comprising means for securely delivering said stored attachment to said delivery address.

22. The system of claim 19, wherein said second delivery address is a telephone number.

* * * * *